(12) United States Patent
Hardof

(10) Patent No.: US 10,166,845 B1
(45) Date of Patent: Jan. 1, 2019

(54) ADJUSTABLE SUN SHIELD

(71) Applicant: LilGift, LLC, Paramus, NJ (US)

(72) Inventor: Waiquan Hardof, Nanuet, NY (US)

(73) Assignee: LilGift, LLC, Paramus, NJ (US)

( * ) Notice: Subject to any disclaimer, the term of this patent is extended or adjusted under 35 U.S.C. 154(b) by 0 days.

(21) Appl. No.: 15/616,214

(22) Filed: Jun. 7, 2017

(51) Int. Cl.
*B60J 3/02* (2006.01)
*B60J 3/00* (2006.01)

(52) U.S. Cl.
CPC .......... *B60J 3/0208* (2013.01); *B60J 3/0204* (2013.01); *B60J 3/0213* (2013.01); *B60J 3/00* (2013.01); *B60J 3/02* (2013.01)

(58) Field of Classification Search
CPC ...... B60J 3/0208; B60J 3/0204; B60J 3/0213; B60J 3/02; B60J 3/00
USPC ......... 296/97.1, 97.5, 97.6, 97.8, 97.9, 97.11
See application file for complete search history.

(56) References Cited

U.S. PATENT DOCUMENTS

| | | | |
|---|---|---|---|
| 2,894,576 A | 7/1959 | Williams | |
| 3,208,792 A | 9/1965 | Martin | |
| D204,248 S | 4/1966 | Fritz | |
| 3,336,073 A | 8/1967 | Berger | |
| 3,428,360 A | 2/1969 | Honor, Sr. | |
| 3,462,867 A * | 8/1969 | Elder | B60J 1/2063 248/475.1 |
| 3,522,968 A | 8/1970 | Honor, Sr. | |
| 3,877,745 A | 4/1975 | Girard | |
| 3,948,554 A | 4/1976 | Barbee | |
| 3,961,820 A | 6/1976 | Spangler | |
| 4,978,160 A | 12/1990 | Welschoff | |
| 5,015,027 A | 5/1991 | Rifaat | |
| 5,165,748 A * | 11/1992 | O'Connor | B60J 3/0208 160/370.23 |
| D335,482 S | 5/1993 | Warsaw | |
| 5,265,929 A | 11/1993 | Pelham | |
| 5,402,924 A | 4/1995 | Gilson | |
| 5,478,131 A | 12/1995 | Marks | |
| 5,484,183 A | 1/1996 | Rosa | |
| 5,564,771 A | 10/1996 | Chesters | |
| 5,641,191 A | 6/1997 | Jia | |
| 5,678,880 A | 10/1997 | Keller | |
| 5,730,484 A | 3/1998 | Robinson | |
| 6,012,758 A | 1/2000 | Fisher | |
| D426,183 S | 6/2000 | Brooks, II et al. | |
| 6,224,137 B1 | 5/2001 | Hunker | |
| D445,744 S | 7/2001 | Hsing | |
| 6,296,293 B1 | 10/2001 | Peterson et al. | |
| 6,325,442 B1 | 12/2001 | Hunker | |
| D476,609 S | 7/2003 | Gibson | |
| D501,655 S | 2/2005 | Tuccinardi | |

(Continued)

*Primary Examiner* — Jason S Morrow
*Assistant Examiner* — E Turner Hicks
(74) *Attorney, Agent, or Firm* — Fortunato IP Law, LLC

(57) ABSTRACT

An improved adjustable sun shield useable on the visor of a vehicle. The inventive sun shield provides significantly improved flexibility for placement of the shield so the shield may be selectively placed and located by a driver or passenger in a location that best blocks in-coming sunlight. Unlike prior art sun shields, which provide the user with limited options for placement (e.g., typically pivoting in single direction), the sun shield enables a user to position the shield at a plurality of locations and in a plurality of positions, thereby increasing the user's ability to block sunlight by placing the sun shield in the best location and position to accomplish this.

9 Claims, 7 Drawing Sheets

(56) References Cited

U.S. PATENT DOCUMENTS

| | | |
|---|---|---|
| 6,981,733 B1 | 1/2006 | Driscoll |
| D524,206 S | 7/2006 | Hohney |
| D526,259 S | 8/2006 | Votz |
| D558,655 S | 1/2008 | Kawamata |
| 7,891,722 B2 * | 2/2011 | Phillips .................. B60J 3/0204 296/97.11 |
| 8,226,149 B2 | 7/2012 | Brule |
| D741,764 S | 10/2015 | Levi |
| D762,539 S | 8/2016 | Marcus |
| D789,855 S | 6/2017 | Amante-Muniz |
| D797,629 S | 9/2017 | Abruzzio |
| D808,318 S | 1/2018 | Amante-Muniz |
| 2004/0217621 A1 | 11/2004 | McCoy |
| 2009/0302634 A1 | 12/2009 | Suzuki |

* cited by examiner

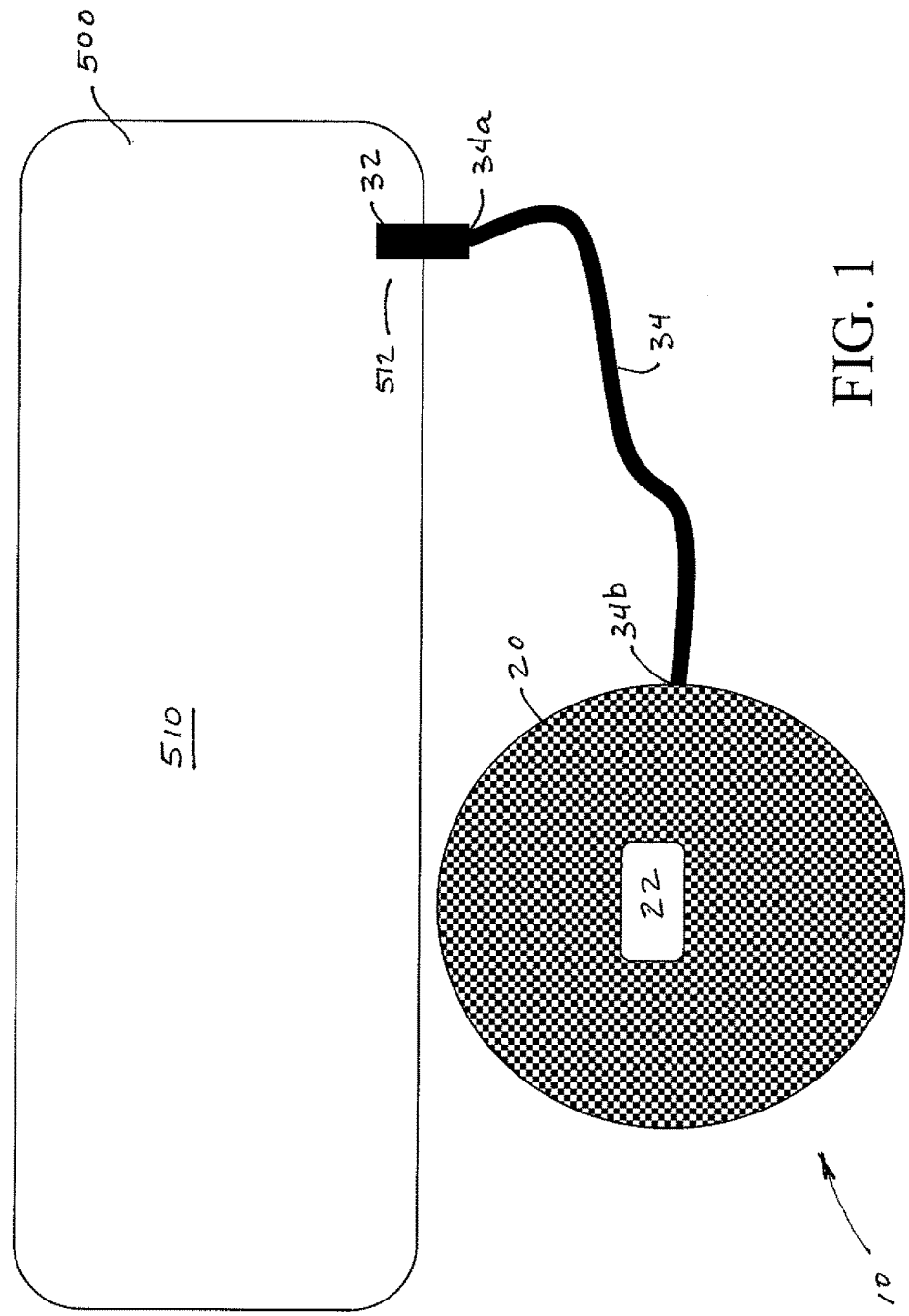

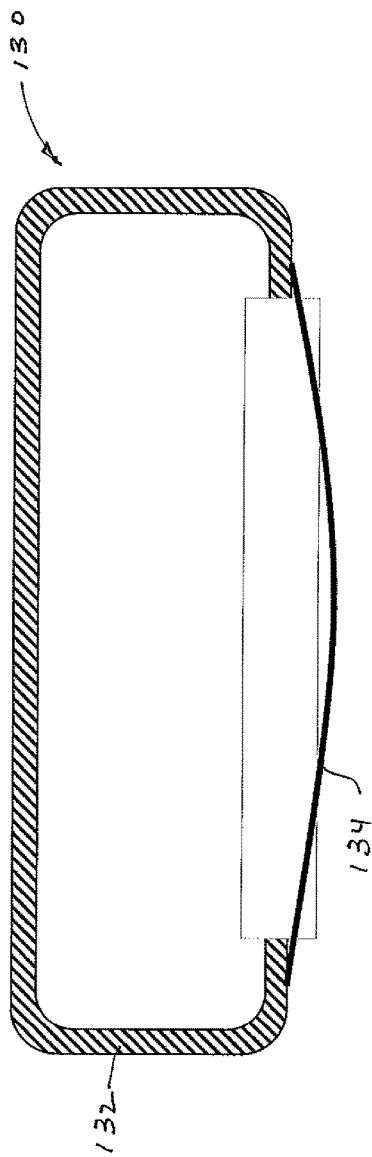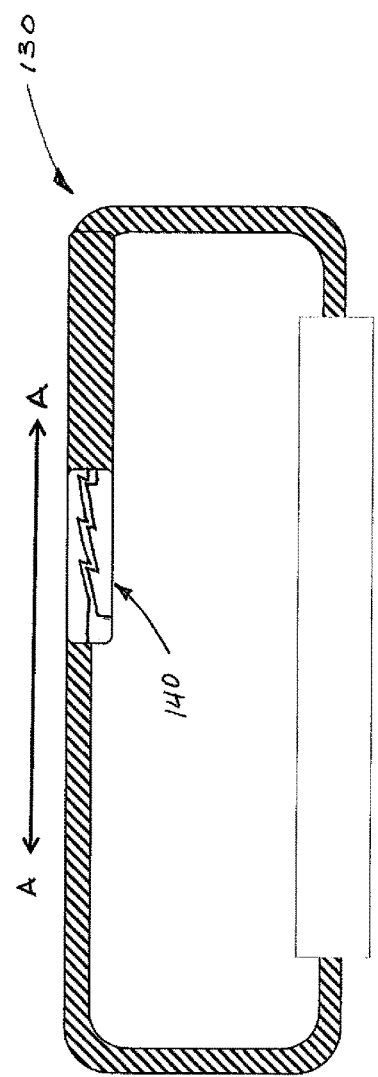

ADJUSTABLE SUN SHIELD

FIELD OF THE INVENTION

The present invention is directed to an adjustable sun shield useable on the visor of a vehicle.

BACKGROUND OF THE INVENTION

The sun visor used in motor vehicles has not changed significantly in decades. It typically comprises a generally rectangular shaped panel that has a first end of one edge fixedly but pivotably connected to the vehicle, and a longitudinally disposed second end of that edge removably held in place by a clip. With the second end is being held in place by the clip, the visor is pivotable about the one edge. When the second end is removed from the clip, the visor is pivotable about the one edge and about the first end. Improvements have been attempted to this simple, yet effective design. For example, extensions or add-ons have been added to make the size of the visor larger. These typically comprise an additional part of the visor that is slideable or pivotable to increase the minor and/or major dimension of the visor. Such solutions can be found, for example in U.S. Pat. Nos. 8,226,149, 3,961,820, 6,325,442, 5,484,183, 6,012,758 and 6,224,137. Each of these solutions suffers the same shortcoming—limited flexibility and variability in positioning the extension or add-on.

There thus exists a need that overcomes the shortcomings of the prior art.

SUMMARY OF THE INVENTION

The present invention is directed to an adjustable sun shield that overcomes the above-described shortcomings of the prior art.

An embodiment of the present invention is directed to an adjustable sun shield connectable to a location having a surface. The inventive sun shield comprises a mount assembly comprising a flexible arm having a clip at an end thereof that is connectable to the location, and a shield having a surface and being connected to the flexible arm at an end opposite the end at which the clip is located, the shield being positionable so the shield surface is at any angle with respect to the location surface.

Another embodiment of the present invention is directed to an adjustable sun shield connectable to a visor. The sun shield of this embodiment comprises a mount connectable to the visor and having an opening defined through the mount that extends along a length of the mount. The inventive sun shield further comprises a connection slideably positioned through the mount, and a shield connectable to the mount by the connection and positionable in a plurality of positions arcuately about the connection. The sun shield of this embodiment is further positionable in a plurality of positions linearly about the connection.

The connection of this embodiment comprises a first part having a base and a cap threadedly connected, and a second part defined as a slot in the shield. The base is disposed in contacting engagement with the visor and further comprises a post positioned to pass through the opening defined in the mount and to pass through the slot in the shield, the cap being threadedly connected with the post to secure the shield in a selected position. Alternatively, the base is disposed in contacting engagement with the visor and wherein the cap further comprises a post positioned to pass through the opening defined in the mount and to pass through the slot in the shield, the cap being threadedly connected with the base to secure the shield in a selected position.

Another embodiment of the present invention is directed to an adjustable sun shield connectable to a visor having a major dimension and the sun shield being positionable in a plurality of positions. The inventive sun shield comprises a mount having a major dimension and being connectable to the visor so the major dimension of the mount is aligned with the major dimension of the visor. The sun shield further comprises a shield having a major dimension and being contactable to the mount so that shield major dimension is positioned transverse to the mount major dimension. The shield is positionable in a plurality of positions along a first axis defined by the major dimension of the mount, and along a second axis defined by the major dimension of the shield, wherein the first axis and the second axis are transverse with each other.

Another embodiment of the present invention is directed to an adjustable sun shield connectable to a visor having a major dimension and the sun shield being positionable in a plurality of positions. The inventive sun shield comprises a mount having a major dimension and being connectable to the visor so the major dimension of the mount is aligned with the major dimension of the visor. The mount of this embodiment further comprises a frame having an opening defined therethrough and a pliable band connected with the frame through the opening. The shield of this embodiment further comprises a shield assembly comprising a shield bracket slideably connected with the frame, and a shield slideably connected with the shield bracket, the shield assembly being positionable in a plurality of positions by movement of the shield bracket along the mount in a direction parallel with the visor major dimension, and by movement of the shield in the shield bracket in a direction transverse with the visor major dimension.

For each embodiment of the present invention, the shield defines a 2-dimensional shape having a perimeter, the perimeter having an arcuate part, a linear part, or an arcuate part and a linear part.

DESCRIPTION OF THE DIAGRAMS

Embodiments of the present invention will now be described regarding the following figures, wherein:

FIG. 1 depicts an adjustable sun shield in accordance with an embodiment of the present invention;

FIGS. 2A-2E depict an adjustable sun shield in accordance with another embodiment of the present invention;

DESCRIPTION OF EMBODIMENTS OF THE INVENTION

Figure 2A:
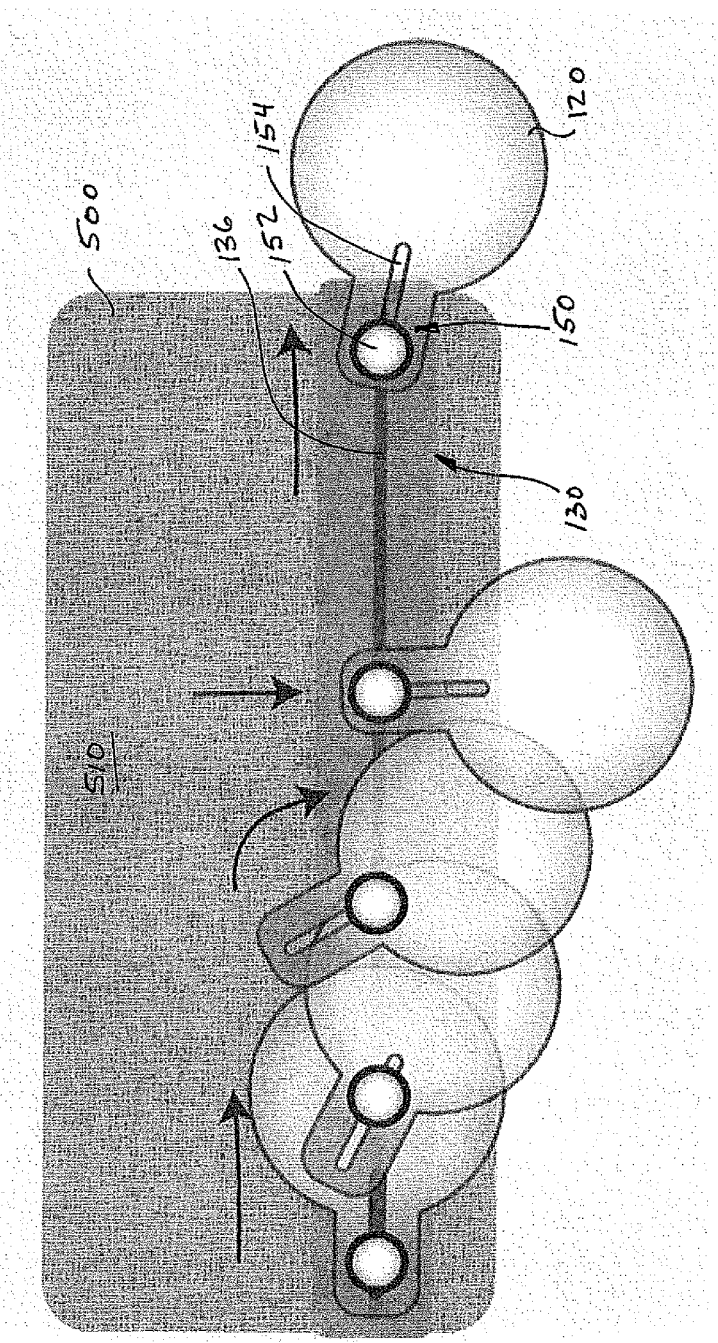

The following describes exemplary embodiments of the present invention. It should be apparent to those skilled in the art that the described embodiments of the present invention are illustrative only and not limiting, having been presented by way of example only. All features disclosed in this description may be replaced by alternative features serving the same or similar purpose, unless expressly stated otherwise. Therefore, numerous and various other embodiments are contemplated as falling within the scope and spirit of the present invention.

The present invention is directed to an improved adjustable sun shield useable on the visor of a vehicle. The foregoing are merely illustrative examples, and do not limit the scope and spirit of the present invention. The inventive sun shield provides significantly improved flexibility for placement of the shield so the shield may be selectively placed and located by a driver or passenger in a location that best blocks in-coming sunlight. Unlike prior art sun shields, which provide the user with limited options for placement (e.g., typically pivoting in single direction), embodiments of the present invention enable a user to position the shield at a plurality of locations and in a plurality of positions, thereby providing a significant improvement of the prior art.

Referring next to the drawings in detail, a first embodiment of the present invention is depicted in FIG. 1. In this embodiment, an adjustable sun shield 10 comprises a mount 30 that is connectable to a location such as a visor 500. The location 512 may be anywhere on a visor 500, or it may be any other location at which the present invention may be suitably placed to block sunlight. The mount 30 comprises a clip 32 such as, for example, an alligator-type clip that is biased in the closed position. The mount 30 further comprises a flexible arm 34 with a first end 34a connected to the clip and a second end 34b connected to a shield 20. The shield 20 has a surface 22 and is preferably circular in shape but may be any two-dimensional shape having an arcuate part, a linear part, or an arcuate part and a linear part. The shield 20 may also be solid, mesh, polarized, or any other construction or configuration that at least partially blocks light.

The inventive sun shield 10 may relate to the clip 32 to any location 512 on the visor 500. Once connected, the shield 20 is positionable in a plurality of positions about the location 512. For example, the shield 20 may be position so its surface 22 is oriented generally parallel with a surface 510 of the visor 500. Alternatively, the shield 20 is positionable so that its surface 22 is at any angle or orientation with respect to the surface 510 of the visor 500. The shield 20 is positionable at any location and at any orientation with respect to the visor 500, limited only by the length and flexibility of the flexible arm 34. The flexible arm 34 enables movement of the shield 20 in any direction and allows positioning of the shield 20 with its surface 22 in any orientation with respect to the surface 510 of the visor 500.

Figure 2B:
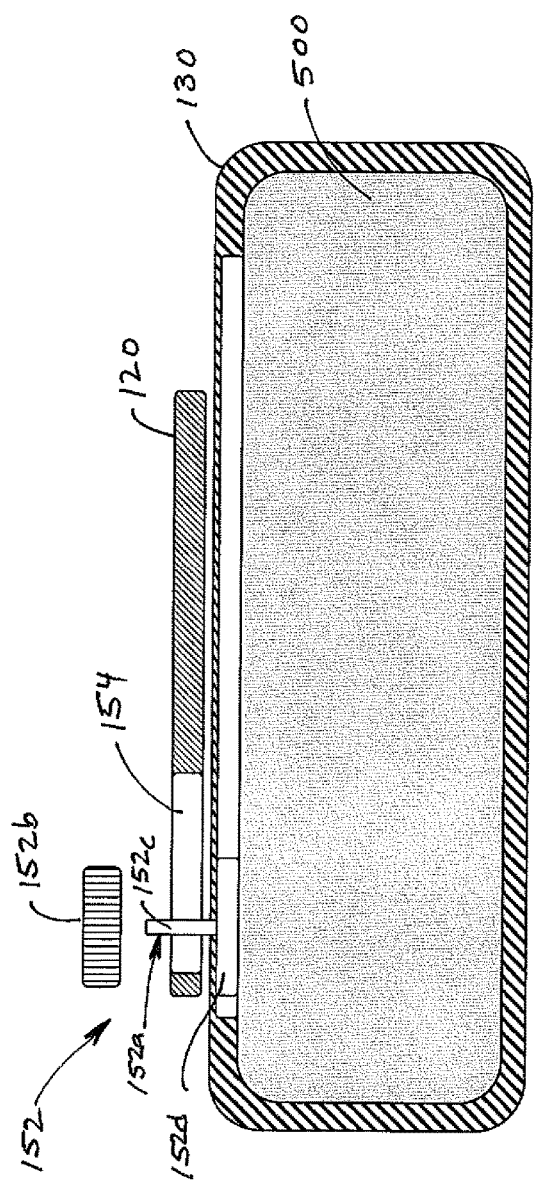

A second embodiment of the present invention is depicted in FIGS. 2A-2E. It should first be noted that multiple shields 120 are depicted in FIG. 2A. A preferred embodiment of the present invention contemplates a single shield 120, and the depiction in FIG. 2A is intended to show possible locations, positionability and moveability of that single shield 120. An adjustable sun shield 120 in accordance with this embodiment is connectable to the visor 500 with a mount 130 that is sized and shaped to be securely placeable on the visor 500 and has a slot 136 defined therethrough. FIGS. 2B, 2D and 2E are cross-sectional views taken along the line B-B of FIG. 2A depicting alternative embodiments of the present invention. The mount 130 may be continuous and of a fixed size, as depicted in FIG. 2B, C-shaped with rigid part 132 and an elastic part 134, as depicted in FIG. 2D, or two-part C-shaped with an adjustable size, as depicted in FIG. 2E. For this embodiment, the size of the mount 130 is adjustable to secure it in place on the visor 500. Adjustability may be provided by a saw-tooth structure 140 with a release (not shown), as depicted in FIG. 2E, or other similar structure that enables the mount 130 to be selectively sized (movement in the direction of arrows A-A) to fit visors 500 of various sizes. Each of these embodiments fits securely over a visor 500 and provides a mount 130 that enables the shield 120 to function in accordance with the present invention, as disclosed herein.

The shield 120 of the embodiment of FIGS. 2A-2E further comprises a connection 150 slideably positioned through the slot 136 of the mount 130.

Figure 2C:
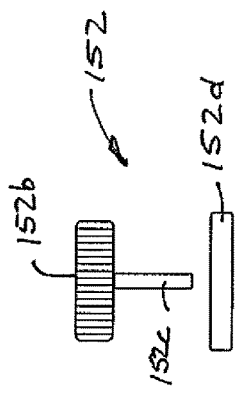

The connection 150 of the mount 130 of this embodiment secures the shield 120 to the mount 130 as described herein. A first embodiment of the connection 150 is depicted in FIG. 2B and comprises a first part 152 and a second part 154. The first part 152 comprises a base 152a and a cap 152b that are preferably threadedly connectable with each other, and the second part 154 comprises a slot defined in the shield 120. The base 152a has a foot 152d and a post 152c that passes through an opening 136 in the mount 130. The base 152a is positioned with the foot 152d in contacting relation with the surface 510 of the visor 500 and is slideable longitudinally along a major dimension of the visor 500 to position the shield 120 as described herein. The base 152a further comprises a cap 152b that is threadedly connectable with the post 152c to secure and release the shield 120 in accordance with this embodiment. Alternatively, the post 152c may be provided as part of the cap 152b and threadedly connectable with the foot 152d, as shown in FIG. 2C.

The shield 120 is connectable to the mount 130 via the connection 150, as depicted in FIG. 2B. In this embodiment, the mount 130 comprises a first rigid part 152 and a second part 154 that enable selective positioning of the shield 120 in a plurality of positions. The first rigid part 152 comprises a cap 152b and a base 152a that are threadedly connected, with a post 152c of the base 152a passing through a slot 154 defined in the shield 120. To position the shield 120, the cap 152b is loosened and the shield 120 is movable along the opening 136 in the mount and is also movable along the slot 154. The shield 120 is thus positionable in any location along the opening 136, i.e., along any part of the visor 500, and is positionable at any point arcuately located about the connection 150. As shown in FIG. 2A, the shield 120 is slideable along the length of the visor 500, and is rotatable about the connection 150. By loosening the cap 152b, a user may slide the shield 120 along the visor 500 and position the shield 120 in a desired location and orientation to best block the sun as the user drives.

Figure 3:
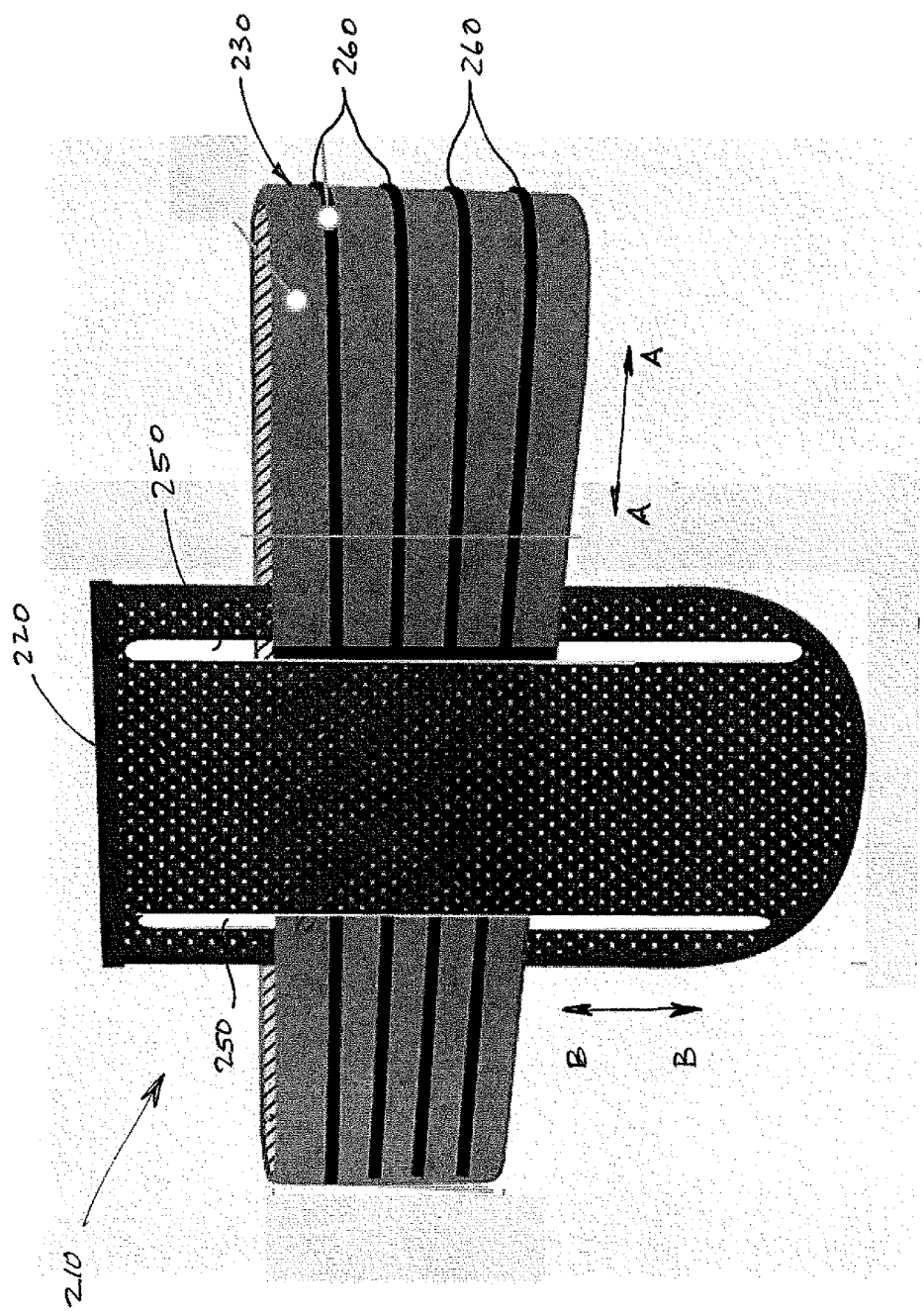
FIG. 3 depicts an adjustable sun shield in accordance with another embodiment of the present invention.

Another embodiment of the present invention is depicted in FIG. 3. An adjustable sun shield 210 in accordance with this embodiment comprises an elastic mount 230 that is sized and shaped to fit securely on a visor 500. A shield 220 is connectable to the mount 230 and moveable with respect thereto. One or more grip strips 260 may be provided on the elastic mount 230 to engage the shield 220 and hold it in position once moved by a user. The shield 220 has defined therein two slots 250 through which the elastic mount 230 passes. The slots 250 enable a user to move the shield 220 in the direction indicated by arrows A-A along the elastic mount 230, and in the direction indicated by arrows B-B transverse to the elastic mount 230. In this way, the shield 220 of this embodiment is movable in a first direction that is generally parallel with a major dimension of the visor 500, and in a direction that is generally parallel with a major dimension of the shield 220. The shield of this embodiment is thus movable along two different axes to enable a user to position the shield 220 in the best location to block the sun.

Figure 4A:
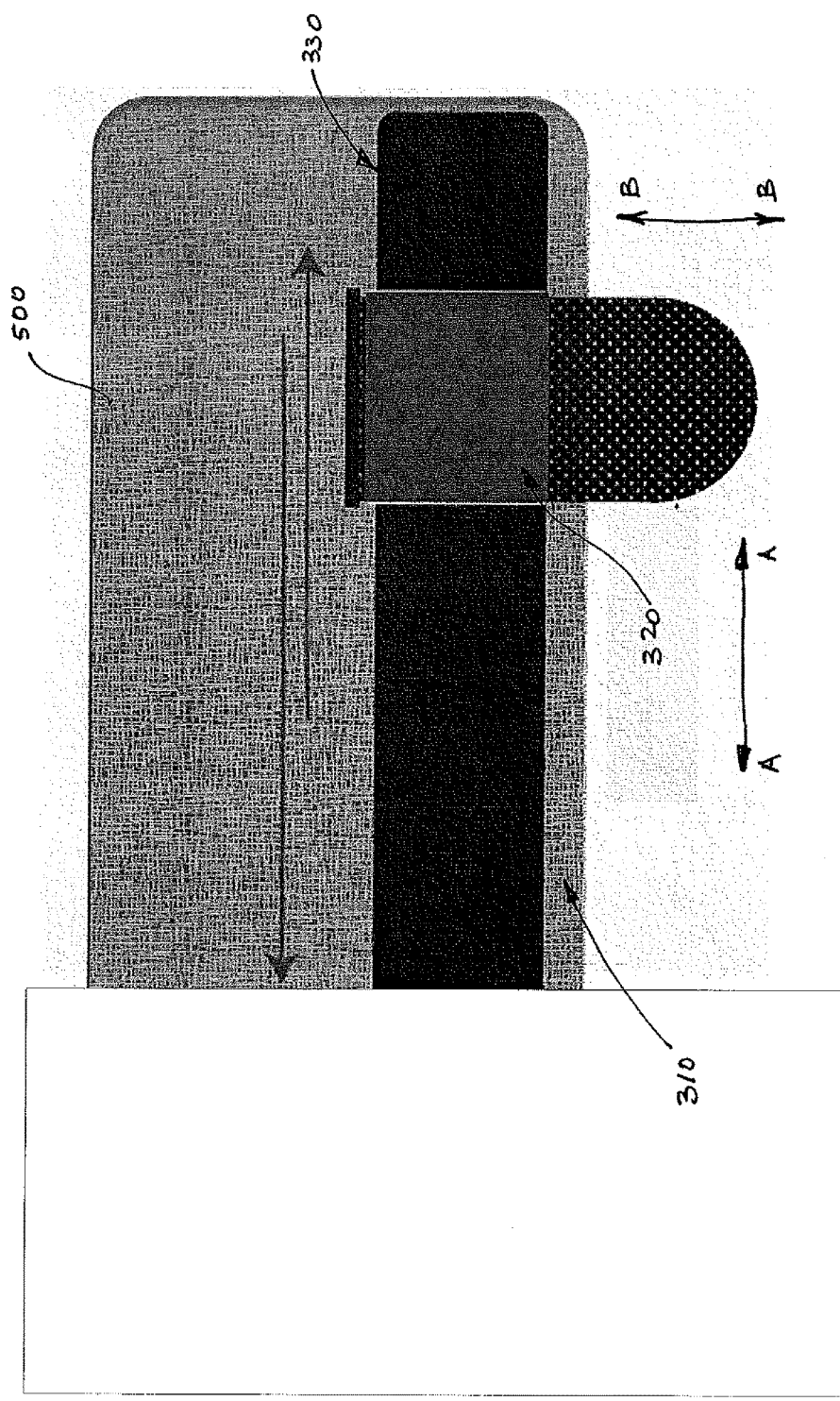
FIGS. 4A and 4B depicts an adjustable sun shield in accordance with another embodiment of the present invention.
Figure 4B:
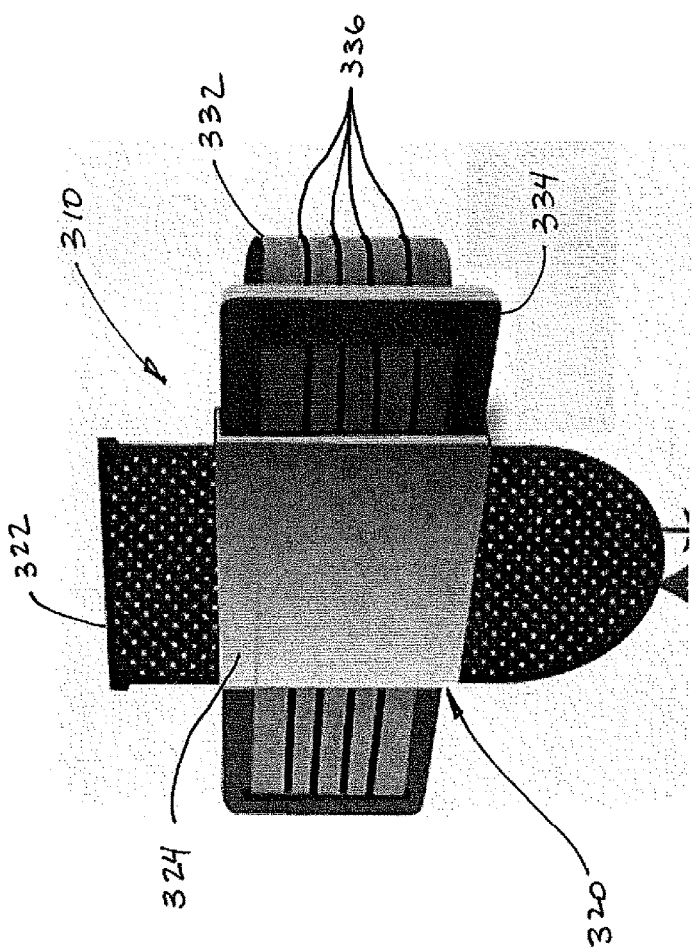

Yet another embodiment of the present invention is depicted in FIGS. 4A and 4B. The adjustable sun shield 310 of this embodiment comprises a mount assembly 330 comprised of an elastic band 332 and a frame 334. The elastic band 332 may have one or more grip strips 336 to engage the shield 320 and hold it in position once moved by a user. The frame 334 has two slots or openings defined therethrough and through which the elastic band 332 may pass. The sun shield 310 of this embodiment further comprises a shield assembly 320 comprised of a shield 322 and a shield bracket 324. The shield bracket 324 is slideably connected with the frame 334, and the shield 322 is slideably connected with the shield bracket 324. The shield assembly 320 is thus slideable along the frame 334 in the direction of arrows A-A (FIG. 4A) generally parallel with the major dimension of the visor 500 to place the shield 322 at any position along the length of the visor 500. The shield 322 is also slideable within the shield bracket 324 in a direction generally transverse to the visor major dimension (see, e.g., FIG. 4A, arrows B-B). Thus, the adjustable sun shield 310 of this embodiment enables the user to move the shield 322 along two different axes, to enable a user to position the shield 322 in the best location to block the sun.

Modifications to embodiments of the present invention are possible without departing from the scope of the invention as defined by the accompanying claims. Expressions such as "including," "comprising," "incorporating," "consisting of," "have," "is," used to describe and claim the present invention are intended to be construed in a non-exclusive manner, namely allowing for articles, components or elements not explicitly described herein also to be present. Reference to the singular is to be construed to relate to the plural, where applicable.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. An adjustable sun shield connectable to a visor and positionable in a plurality of positions, the visor having a major dimension and the sun shield comprising:
   a mount having a major dimension and being connectable to the visor so the major dimension of the mount is aligned with the major dimension of the visor; and
   a shield having a major dimension and being contactable to the mount so that shield major dimension is positioned transverse to the mount major dimension, the shield being positionable in a plurality of positions along a first axis defined by the major dimension of the mount, and along a second axis defined by the major dimension of the shield, wherein the first axis and the second axis are transverse with each other;
   wherein the mount further comprises:
   a frame having an opening defined therethrough and a pliable band connected with the frame through the opening;
   and wherein the shield further comprises:
   a shield assembly comprising a shield bracket slideably connected with the frame, and a shield slideably connected with the shield bracket, the shield assembly being positionable in a plurality of positions by movement of the shield bracket along the mount in a direction parallel with the visor major dimension, and by movement of the shield in the shield bracket in a direction transverse with the visor major dimension.

2. An adjustable sun shield according to claim 1, wherein the shield defines a 2-dimensional shape having an arcuate part.

3. An adjustable sun shield according to claim 2, wherein the shield has a linear part.

4. An adjustable sun shield according to claim 2, wherein the shield has an arcuate part and a linear part.

5. An adjustable sun shield according to claim 1, wherein the mount further comprises a grip engaging the shield to hold the shield in one of the plurality of positions.

6. An adjustable sun shield according to claim 1, wherein the mount is elastic.

7. An adjustable sun shield according to claim 1, wherein the shield further comprises two slots through which the mount passes.

8. An adjustable sun shield according to claim 7, wherein each of the two slots is disposed along the major dimension of the shield.

9. An adjustable sun shield according to claim 7, wherein the mount further comprises a grip engaging the shield at a location proximate at least one of the two slots.

* * * * *